Oct. 8, 1968 S. ALEXANDER 3,404,893

PHONOGRAPH

Filed Oct. 24, 1965 2 Sheets-Sheet 1

INVENTOR.
SONNY ALEXANDER
By Harry [signature]
ATTORNEY.

INVENTOR.
SONNY ALEXANDER
By Harry Kotler
ATTORNEY.

United States Patent Office 3,404,893

Patented Oct. 8, 1968

3,404,893

PHONOGRAPH

Sonny Alexander, 10136 National Blvd., Los Angeles, Calif. 90034

Filed Oct. 24, 1965, Ser. No. 504,332
8 Claims. (Cl. 274—1)

ABSTRACT OF THE DISCLOSURE

A miniaturized phonograph consisting of a cylinder having recording grooves and gear teeth on its outer surface. The gear teeth drive, through an appropriate gear train, a paddle wheel which acts as both a speed governor and a brake.

The present invention relates to a phonograph and more particularly to a miniaturized sound reproduction system for use as a prerecorded or self-recorded, greeting and similar mailable devices, as well as a gift attachment, story record and a telephone message recorder.

The conventional written message or story many times lacks the personal touch of a correspondent or storyteller. A letter, a card or a printing is more formal than a spoken message because the writing requires some forethought and composition and lacks the spontaneous vernacular of everyday speech with its special vocal inflections. Conventional devices have been made to overcome this problem; however, they either take the form of a simple flexible disc which must be played on a conventional phonograph or the form of a relatively complex and heavy sound reproducing mechanism. The use of a flexible disc, by its very nature, cannot be used in every situation since it is not always possible for the recipient of the message to have a phonograph at hand. It is also limited in the length of the message since only a small radial surface may be utilized for the message. On the other hand, self-contained mailable and portable phonographs are comparatively heavy, making them costly to mail and to transport. Furthermore, they are relatively complicated and include numerous components which may increase their cost of manufacture and tend to subject them to damage while in transit or through rough handling. Some conventional transportable phonographs are operated by an electric motor and require a source of electricity which may not be available where the recipient resides. In addition, the use of electricity may preclude the use of electrically operated phonographs by children who are unable to appreciate the risks of electrical shock and burns.

The above-discussed problems are aggravated with respect to telephone message recorders. Special electronic equipment is required to tie the recording mechanism into the telephone in order to take and preserve the message and such equipment is expensive and complex. What is required is a simple and low-cost device.

The present invention overcomes these problems by providing a simple, lightweight, compact and replayable phonograph. It comprises a grooved cylindrical record, which is preferably of a truncated cone shape, having a helical record groove disposed on its exterior surface so that a large message length may be obtained. The record is rotatably journalled on a shaft and the shaft is also rotatably journalled in a casing. A ratchet is secured between the shaft and the casing to allow rotation of the shaft only in one direction of rotation. Consequently, the ratchet acts as a one-way brake. A spring is disposed within the cylinder to conserve space and secured between the shaft and the interior surface of the record. Thus, after the spring is wound, the cylinder will rotate since one end of the spring, being affixed to the shaft, will not move due to the ratchet. A detent is provided between the casing and the cylinder for locking the cylinder in position so that the record will not rotate while the spring is wound. Consequently, the detent acts on an "Off-On" switch.

Sound is produced from the groove by means of a speaker assembly and a tone arm having a needle at one end thereof. The speaker assembly includes a spring loaded reciprocable cup-shaped element which presses against the needle end of the arm to bias the needle into normal reception within the groove. The needle follows the groove as the cylindrical record revolves. The needle is caused to vibrate and the vibrations are transmitted directly through the element to a speaker cone for producing the sound. The tone arm at the end opposite from the needle is pivotably secured to the casing so that the needle may swing through a short arc having a path which is tangentially disposed to the grooved exterior surface. The tone arm is loosely journalled in the pivot to provide a small amount of movement lateral to the path at the pivot for a purpose to be shortly described.

The phonograph further includes a combined brake and governor assembly which is formed as a paddle wheel. The paddle wheel is connected by reduction gearing to the record cylinder so that, as the record revolves, the paddle wheel will also revolve. However, as the paddle wheel rotates, its rotation is impeded and slowed by surrounding air acting on the paddles. Thus, the paddle wheel, through its geared connection with the record cylinder, regulates the speed thereof and acts as a governor. The paddle wheel is disposed adjacent to and above the tone arm so that, as the tone arm sweeps through the arcuate path, it will contact the paddle wheel at the time when the needle is moved into the terminal portion at the end of the message groove. Upon contact with the paddle wheel, the tone arm interferes with the rotation of the paddle wheel and, because of the reduction gearing connection, rotation of the cylindrical record is stopped to shut off the phonograph. Thus, the paddle wheel also operates as a brake.

In order to replay the message, the phonograph incorporates a return mechanism comprising a spring lever disposed adjacent to the speaker element. The lever is manipulated from the outside of the casing to abut against the element and to push it away from the tone arm. Thereupon, the needle is no longer biased into the groove and, because of the slight lateral play in the tone arm provided by the loose pivot and because of the truncated cone shape of the record, the tone arm drops under the influence of gravity so that the needle is again positioned adjacent the beginning or play portion of the groove for replay of the message.

A key on the outside of the casing is secured to the record shaft so that the spring may be wound. Because of the ratchet, the spring may be wound only in one direction and be prevented from unwinding. The detent, provided between the casing and the cylinder, locks the cylinder in position while the spring is being wound. In some cases, however, the detent may be omitted since the small weight of the record wheel and the resistance of the reduction gearing and the paddle wheel makes it possible to wind the spring by the key faster than the spring would unwind as the cylinder tends to rotate.

It is, therefore, an object of the present invention to provide a compact phonograph.

Another object is the provision of a thin and lightweight phonograph suitable for posting in the mail.

Another object is to provide a sturdy and low-cost phonograph.

Another object is the provision of an easily operable phonograph.

A further object is to provide a phonograph having a simple mechanism with few movable components.

Another object is the provision of a replayable message device.

Another object is to provide a phonograph with a novel governor-brake combination.

Other aims and objects, as well as a more complete understanding of the present invention, will appear from the following explanation and the accompanying drawings, in which.

Figure 1:
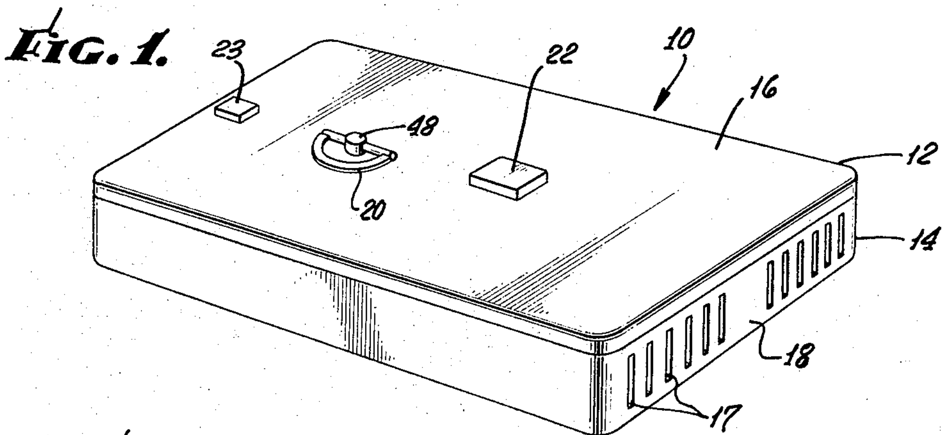
FIG. 1 is a perspective view of the phonograph.

Referring to FIG. 1, a phonograph 10 comprises a casing 12 having a bottom section 14 and a cover 16 secured in any appropriate manner to the bottom section. A series of slots 17 are disposed in one end 18 of the bottom section so that sound may emanate from the phonograph. Extending through the cover are a foldable key 20 for winding up a drive mechanism, a return button 22 for manual manipulation of a return mechanism and an "Off-On" switch operator 23 for allowing the drive mechanism to be wound up.

In FIGS. 2–7 phonograph 10 comprises a cylindrical record wheel 24, a drive mechanism 26, a sound reproducer 28, a speed governor and brake assembly 30, and a return mechanism 32.

The record wheel (see FIGS. 2 and 4) comprises a cylinder 34 provided with a closed end 36 having a centrally enlarged hole 37. The cylinder is configured as a truncated cone wherein the periphery is slightly reduced as the surface extends toward closed end 36. The purpose of this slightly truncated conical shape will be explained shortly. A driving gear 38 is secured on the periphery of the enclosed end. An exterior surface 40 and an interior surface 42 are disposed respectively on the outside and the inside of the cylinder. A record 44, provided with a sound producing groove 45 beginning at a play portion 46 and culminating in a terminal portion 47, is secured to the exterior surface of the cylinder to form a part thereof and follows the slightly truncated conical shape thereof. The groove may be removable from the cylinder in order to interchange different messages by either the manufacturer or the user. A shaft 48 is journalled in bottom section 14 and cover 16 for rotation therein. A projection 50 is formed on the interior of the bottom section to provide a journal for one end 51 of shaft 48 and to support cylinder 34 at its closed end 36. A bushing or bearing 52 is inserted in closed end hole 37 to form a frictionless journal for the cylinder on the shaft.

Drive mechanism 26 comprises a spirally wound spring 54 having one end 56 secured by a rivet 58 or similar means to interior surface 42 of cylinder 34 of the record wheel. A second end 60 of the spring is secured to the shaft through a slot 61 therein. A ratchet or one-way brake 62 (see FIGS. 4 and 5) comprises spring tines 64 secured to the shaft and an abutment plate 66 secured by adhesive or screws to cover 16. If desired, plate 66 may be formed as part of the cover. Plate 66 is provided with indentations 67 for reception of the tine ends therein. Projections will function as well as indentations 67. Key 20 is secured to another end 69 of shaft 48 so that, when the key is turned to rotate the shaft, spirng 54 is wound only in one direction of rotation and reverse rotation of the shaft is prevented by the tines engaging with the indentations. A spring metal detent 65 projects through a slot 67 of cover 16 of casing 12 and is secured to bottom section 14 to contact gear 38. Detent 65 is manually manipulable from outside the casing to prevent any movement of the record while the spring is being wound.

Figure 7:
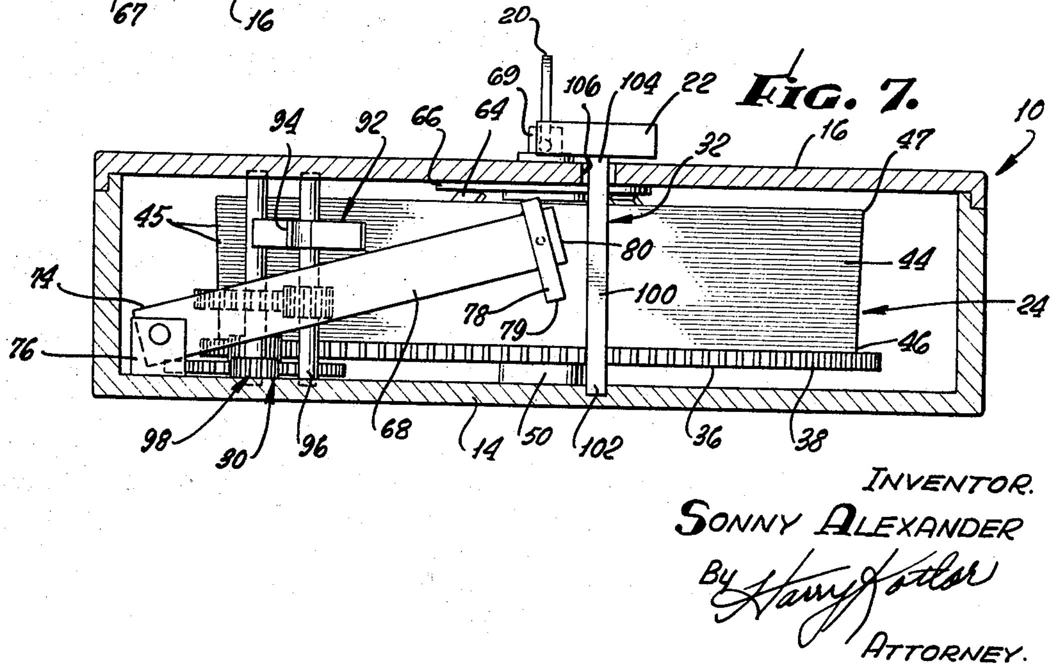
FIG. 7 is an end view of the phonograph taken along line 7—7 of FIG. 4.

Sound reproducer 28 (see FIGS. 2–4 and 7) includes a tone arm 68 with a pickup needle 70 disposed therein and a speaker assembly or audio device 72. The tone arm is loosely journalled at one end 74 in a pivot 76 which is secured to bottom section 14 of casing 12. The looseness of the journalling is important, as will be explained below, to allow the tone arm a slight lateral movement in addition to a sweep through an arcuate path with respect to interior surface 42 of the cylinder as it is carried to groove terminal portion 47 as the record rotates. An elongated rib 78, which extends substantially at right angles to arm 68, is secured to needle 70 at an end 80 of tone arm 68 but is slightly spaced therefrom so that vibrations in the needle will not be dampened by the mass of the tone arm. As shown in FIG. 7, rib 78 includes a lower end 79 which will rest on bottom section 14 when the needle is disposed in the beginning or play portion 46 of groove 45. Pickup needle 70 is secured within end 80 of the tone arm and extends into rib 78. As disclosed in FIG. 2, needle 70 is angled with respect to groove 45 to provide a smooth contact therein as the record rotates.

Speaker assembly 72 (see FIGS. 2 and 4) comprises an oval cone 82 provided with a tubular end 84 for reception of a hollow cup-shaped element 86 which reciprocates therein. The cup-shaped element has a closed end 87 and one end of a spring 88 resides within hollow element 86 and against closed end 87 for abutment thereof against rib 78. A stud 90 is formed on the interior of slotted end 18 of casing 12 for retention of the other end of spring 88. Spring 88 is disposed under compression to exert a bias toward record 44 and the bias is directed against the closed end of element 86 to position the tip of needle 70 in groove 45 to provide a normal disposition of the needle within groove 45 for playing the record.

In operation, when needle 70 is disposed within beginning or play portion 46 of the groove and spring 54 is wound, cylinder 34 rotates under tension of spring 54 and needle 70 will move in an arcuate path with respect to exterior surface 40 as the needle follows the groove from play portion 46 to terminal portion 47. Needle 70 is thus caused to vibrate and these vibrations are transmitted through rib 78 and element 86 to cone 82 which moves to convert the vibrations into sound. Since rib 78 is elongated, as shown most clearly in FIGS. 3 and 4, it will slide with respect to element 86 to transmit continuously the vibrations thereto.

Speed governor and brake assembly 30 (see FIGS. 2, 3 and 7) comprises a paddle wheel member 92 formed from a series of paddles 94. Paddle wheel 92 is mounted on a pin 96 which is rotatably journalled in casing 12. Reduction gearing 98, comprising gears **98*a*, 98*b*, 98*c*, 98*d* and 98*e*, connects paddle wheel 92 to driving gear 38 so that the paddle wheel will be rotated by drive mechanism 26. When the paddle wheel rotates, paddles 94 likewise rotate. However, the turning thereof is slowed by the resistance of the normally static air within casing 12. This resistance to rotation of paddle wheel 92 is transmitted to record wheel 24 through driving gear 38 and gears 98*a* to 98*e* of reduction gearing 98. Thus, paddle wheel 92 acts as a governor to regulate the speed of rotation of record wheel 24. Since the speed of rotation of record wheel 24 determines the quality and extent of the sound produced by sound reproducer 28, the surface area and number of paddles 94 and the gear ratios of gears 98*a* to 98*e* are carefully calculated so that paddle wheel 92 properly governs the speed of record wheel 24. It is preferred that the governor be embodied as a series of paddles; however, other governors may be employed for this purpose. Paddle wheel member 92 is disposed above and adjacent to tone arm 68 so that, when needle 70 is disposed in terminal portion 47 of groove 45, arm 68 has been swept to the culmination of its arcuate path which results in contact with the paddle wheel and stops rotation thereof by projection of tone arm 68 into the path of rotation of paddles 94. Because of the connection through reduction gearing 98 with record wheel 24, when paddle wheel 92 is thus prevented from rotating, record wheel 24** also ceases to rotate. Consequently, the paddle wheel also acts as a brake.

Figures 2, 3:
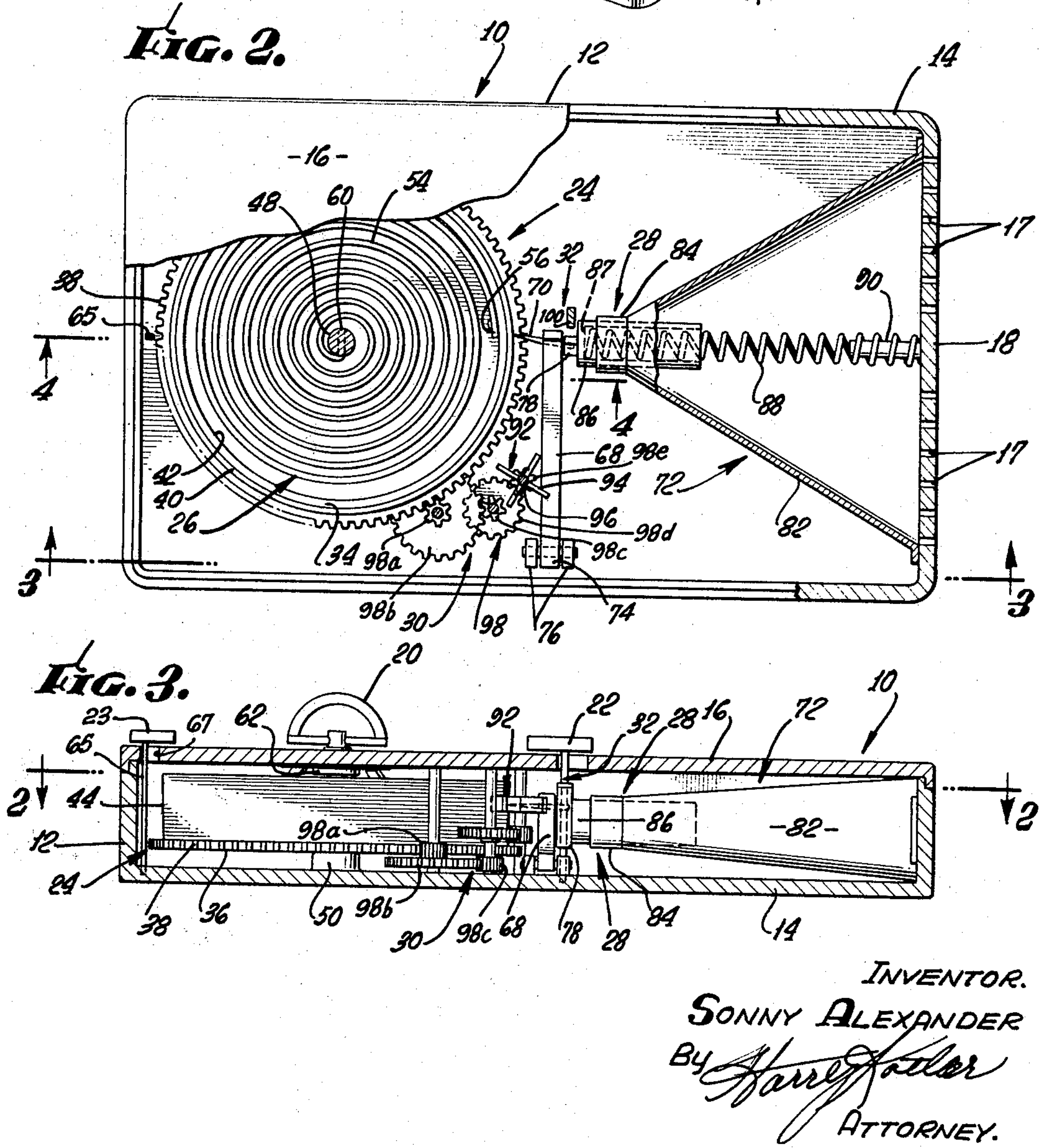
FIG. 2 is a top view of the invention taken along line 2—2 of FIG. 3 with the cover partially cut away.
FIG. 3 is a side elevational view of the phonograph taken along line 3—3 of FIG. 2.
Figure 4:
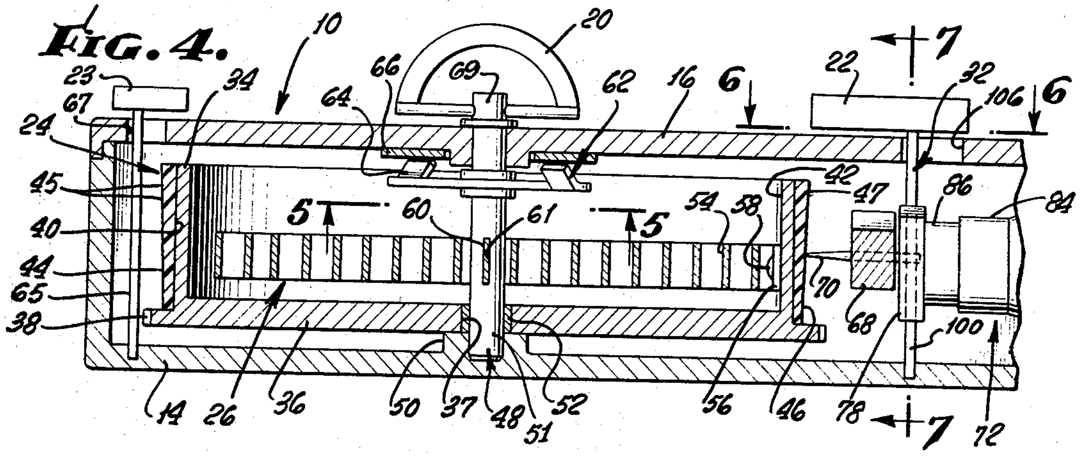
FIG. 4 is a slightly enlarged end elevational view of the phonograph taken along line 4—4 of FIG. 2.
Figure 5:
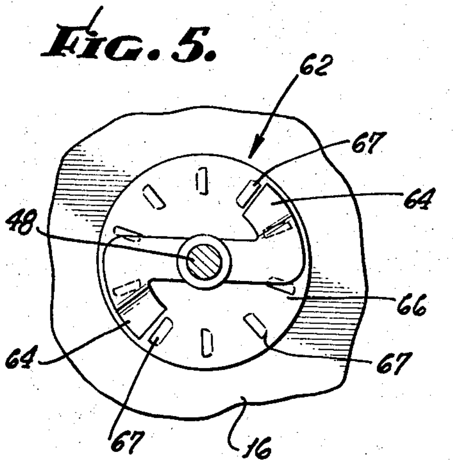
FIG. 5 is a view of the ratchet taken along line 5—5 of FIG. 4.
Figure 6:
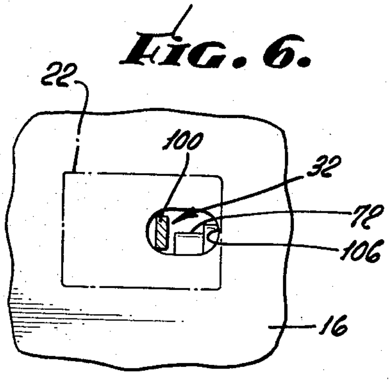
FIG. 6 is a partial section of the return mechanism showing a button manipulator in phantom taken along line 6—6 of FIG. 4.

If it is desired to replay the message recorded in groove 45, return mechanism 32 is operated. As shown most clearly in FIGS. 2–4, 6 and 7, this mechanism comprises a spring lever 100 having an end 102 secured in any appropriate manner to or held within bottom section 14 of casing 12 and another end 104 extending through an elongated slot 106 in cover 16 (see FIG. 6). Button 22 is secured to end 104 of the spring lever for manual manipulation of lever 100. As depicted in FIG. 2, lever 100 is positioned adjacent to element 86 of speaker assembly 82. Normally, the spring lever does not contact the hollow element and, if moved, lever 100 will spring back to its normal position shown in FIG. 2.

To operate return mechanism 32, phonograph 10 is positioned so that it is held upright, i.e., cover 16 of casing 12 faces upwards from the ground, in order to take advantage of the force of gravity. Button 22 is pushed sideways toward slotted end 18 of the casing and held in this position for a short time so that lever 100 contacts element 86 of speaker assembly 82 to exert a force opposed to the bias of spring 88 and to move element 86 away from rib 78. Normally, this operation is performed at the end of the message when needle 70 is disposed in terminal portion 47 of groove 45. Because tone arm 68 is loosely pivoted to bottom section 14 in pivot 76 and because cylinder 34 and record 44 are configured as truncated cones, needle 70 disengages from and slips out of groove 45 and falls under the influence of gravity until the needle is repositioned adjacent beginning or play portion 46 of groove 45. The truncated cone shape avoids scraping and scratching of groove 45 as the needle falls. Although the truncated conical shape is preferred, other means may be employed to prevent such scraping and scratching such as attachments to the tone arm and spring lever 100. When the operator's finger is removed from button 22, release of the return mechanism is effected, i.e., hollow element 86 of speaker assembly 72 re-engages with rib 78 and arm 68 under the bias of spring 88 to position the tip of needle 70 again within groove 45. Spring 54 is then rewound by turning key 20 in a counterclockwise direction with respect to FIG. 2 while detent 65 engages gear 38 and the message will be replayed after release of switch 23.

Although the invention has been described with reference to a particular embodiment thereof, it will be understood that various changes and modifications may be made therein without departing from the spirit of the invention or the scope of the appended claims.

I claim:

1. A phonograph for use as a greeting, message, story and the like having a casing and comprising:
a record wheel including
a shaft journalled in said casing,
a truncated conical cylinder mounted for rotation on said shaft and provided with a closed end and exterior and interior surfaces, said exterior surface having a helical sound reproducing groove disposed thereon,
the groove having a play portion and a terminal portion, and
a cylinder gear formed on said cylinder;
a drive mechanism including
a spirally coiled spring arranged within said cylinder and secured to said shaft and to said interior surface for driving said cylinder in a single direction of rotation, a ratchet secured to said shaft and to said casing for permitting rotation of said shaft in only the single direction, and a detent affixed to said casing and engageable with said cylinder gear for preventing rotation thereof;
a sound reproducer including
a tone arm having opposed ends,
one of said ends having a pivotable and loose connection to said casing and the other of said ends having a sweep along an arcuate path disposed tangentially with respect to said exterior surface,
the path having a beginning at the groove play portion and a culmination at the groove terminal portion,
a pickup needle secured within said arm at said other end, said needle having a normal disposition within the groove for movement from the play portion to the terminal portion along the arcuate path and
a rib secured to said needle and disposed substantially along the arcuate path, and
a speaker secured to said casing and including a spring loaded element having a bias directed toward said cylinder,
said rib normally having a slidable contact with said element and said element exerting the bias against said needle for the normal disposition thereof within the groove;
a combined speed governor and brake assembly including
reduction gearing journalled in said casing and meshed with said cylinder gear, and
a paddle wheel journalled in said casing, connected to said reduction gearing for rotation by said spring, and disposed in the arcuate path to provide the culimination;
said arm positionable to have a contact with said paddle wheel at the culmination when said needle moves within the groove to the terminal portion as said cylinder is driven to stop rotation of said cylinder with respect to said shaft, said casing and said needle; and
a return mechanism including
a spring lever having one end secured in said casing and a second movable end, said lever positioned between said arm and said element and contactable with said element
to exert a force against the bias for breaking the contact between said rib and said element,
to permit movement of said arm along the arcuate path with respect to said exterior surface and of said needle independent of the groove,
to disengage the contact of said arm and said paddle wheel, and
to allow repositioning of said needle in the groove play portion.

2. A phonograph comprising a rotatable record provided with play and terminal portions, a drive mechanism secured to said record for rotation thereof, a tone arm having a follower connected thereto, said follower connectable with and movable by and with respect to said record upon rotation thereof, an audio device connected to said follower, and a brake-governor assembly connected to and driven by said drive mechanism to regulate the speed of said drive mechanism and associable with said arm to stop operation of said drive mechanism when said follower is disposed at the terminal portion.

3. A phonograph comprising a rotatable record provided with play and terminal portions, a drive mechanism secured to said record for rotation thereof, a tone arm having a follower connected thereto, said follower connectable with and movable by and with respect to said record upon rotation thereof, an audio device connected to said follower, and a brake-governor assembly comprising a member connected to and drivingly imparted with movement by said drive mechanism to regulate the speed of said drive mechanism, and said tone arm being movable into the movement of said member to interfere with the movement and to stop operation of said drive mechanism when said follower is disposed at the terminal portion.

4. A phonograph comprising a rotatable record provided with play and terminal portions, a drive mechanism secured to said record for rotation thereof, a tone arm having a follower connected thereto, said follower connectable with and movable by and with respect to said record upon rotation thereof, an audio device having a connection to said follower, a brake-governor assembly secured to and driven by said drive mechanism to regulate the speed of said drive mechanism and associable with said arm to stop operation of said drive mechanism when said follower is disposed at the terminal portion, and a return mechanism connectable to said audio device for disengaging the connection of said follower from said device to permit said follower to be returned to the play portion.

5. A phonograph comprising a rotatable record including a cylinder having exterior and interior surfaces, the exterior surface having a helical sound groove provided with play and terminal portions, a drive mechanism secured to said record for rotation thereof, a tone arm having a follower connected thereto, said follower movable by and with respect to said record upon rotation thereof, an audio device connected to said follower, said follower having a sweep along an arcuate path disposed tangentially with respect to the exterior surface, the path having a beginning at the groove play portion and a culmination at the groove terminal portion, said follower normally disposed within the groove by a bias exerted thereon by said audio device, a brake-governor assembly comprising a member connected to and drivingly imparted with movement by said drive mechanism to regulate the speed of said drive mechanism, and said tone arm being movable into the movement of said member to interfere with the movement and to stop operation of said drive mechanism when said follower is disposed at the terminal portion.

6. A phonograph comprising a rotatable record including a cylinder having exterior and interior surfaces, the exterior surface having a helical sound groove provided with play and terminal portions, a drive mechanism secured to said record for rotation thereof, a tone arm having a follower connected thereto, said follower movable by and with respect to said record upon rotation thereof, an audio device connected to said follower, said follower having a sweep along an arcuate path disposed tangentially with respect to the exterior surface, the path having a beginning at the groove play portion and a culmination at the groove terminal portion, said follower normally disposed within the groove by a bias exerted thereon by said audio device, and a brake-governor assembly comprising a member connected to and drivingly imparted with movement by said drive mechanism to regulate the speed of said drive mechanism, said tone arm being movable into the movement of said member to interfere with the movement and to stop operation of said drive mechanism when said follower is disposed at the terminal portion, and a return mechanism connectable to said audio device for disengaging the connection of said follower from said device to permit said follower to be returned to the play portion.

7. A phonograph for use as a mailable story, message or greeting, comprising a casing, a shaft journalled therein, a rotatable record wheel provided with a truncated conically shaped cylinder rotatably journalled on said shaft and having exterior and interior surfaces, the exterior surface having a truncated conically shaped helical sound groove provided with play and terminal portions, a drive mechanism including a driver secured to said shaft and to the interior surface of said cylinder for rotation of said cylinder, a tone arm having a follower connected thereto, said follower movable by and with respect to said record wheel upon rotation thereof, a one-way brake secured to said shaft and to said casing, an audio device connected to said follower, said follower having a sweep along an arcuate path disposed tangentially with respect to the exterior surface, the path having a beginning at the groove play portion and a culmination at the groove terminal portion, said follower normally disposed within the groove by a bias exerted thereon by said audio device, a brake-governor assembly comprising a member connected to and drivingly imparted with movement by said drive mechanism to regulate the speed of said drive mechanism, said tone arm being movable into the movement of said member to interfere with the movement and to stop operation of said drive mechanism when said follower is disposed at the terminal portion.

8. A phonograph for use as a mailable story, message or greeting, comprising a casing, a shaft journalled therein, a rotatable record wheel provided with a truncated conically shaped cylinder rotatably journalled on said shaft and having exterior and interior surfaces, the exterior surface having a truncated conically shaped helical sound groove provided with play and terminal portions, a drive mechanism including a driver secured to said shaft and to the interior surface of said cylinder for rotation of said cylinder, a detent disposed in said casing and engageable with means on said record wheel for selectable prevention of rotation thereof, a tone arm having a follower connected thereto, said follower movable by and with respect to said record wheel upon rotation thereof, a one-way brake secured to said shaft and to said casing, an audio device connected to said follower, said follower having a sweep along an arcuate path disposed tangentially with respect to the exterior surface, the path having a beginning at the groove play portion and a culmination at the groove terminal portion, said follower normally disposed within the groove by a bias exerted thereon by said audio device, a brake-governor assembly comprising a member connected to and drivingly imparted with movement by said drive mechanism to regulate the speed of said drive mechanism, said tone arm being movable into the movement of said member to interfere with the movement and to stop operation of said drive mechanism when said follower is disposed at the terminal portion.

References Cited

UNITED STATES PATENTS

| | | | |
|---|---|---|---|
| 3,286,396 | 11/1966 | Ryan | 46—232 |
| 2,635,883 | 4/1953 | Ponticello | 274—1 |

LEONARD FORMAN, *Primary Examiner.*

FELIX J. D'AMBROSIO, *Assistant Examiner.*